United States Patent
Knoll et al.

(10) Patent No.: US 9,650,464 B2
(45) Date of Patent: May 16, 2017

(54) METHOD FOR PRODUCING ASYMMETRICALLY FORMED, STAR-BRANCHED VINYL AROMATIC-DIENE BLOCK COPOLYMERS

(71) Applicant: STYROLUTION EUROPE GMBH, Frankfurt am Main (DE)

(72) Inventors: Konrad Knoll, Mannheim (DE); Ulrike Dardin, Laudenbach (DE)

(73) Assignee: INEOS STYROLUTION EUROPE GMBH (DE)

( * ) Notice: Subject to any disclaimer, the term of this patent is extended or adjusted under 35 U.S.C. 154(b) by 0 days.

(21) Appl. No.: 14/409,238

(22) PCT Filed: Jun. 24, 2013

(86) PCT No.: PCT/EP2013/063096
§ 371 (c)(1),
(2) Date: Dec. 18, 2014

(87) PCT Pub. No.: WO2014/001233
PCT Pub. Date: Jan. 3, 2014

(65) Prior Publication Data
US 2015/0183917 A1    Jul. 2, 2015

(30) Foreign Application Priority Data
Jun. 29, 2012  (EP) ..................... 12174394

(51) Int. Cl.
*C08F 293/00* (2006.01)
*C08L 25/06* (2006.01)
*C08F 297/04* (2006.01)
*C08L 53/02* (2006.01)

(52) U.S. Cl.
CPC ...... *C08F 293/005* (2013.01); *C08F 297/044* (2013.01); *C08L 25/06* (2013.01); *C08L 53/02* (2013.01)

(58) Field of Classification Search
None
See application file for complete search history.

(56) References Cited

U.S. PATENT DOCUMENTS

| 3,639,517 A | 2/1972 | Kitchen et al. |
| 4,091,053 A | 5/1978 | Kitchen |
| 5,554,690 A | 9/1996 | Spence et al. |
| 2003/0232928 A1 | 12/2003 | Atwood et al. |

FOREIGN PATENT DOCUMENTS

| EP | 0 316 671 A2 | 5/1989 |
| EP | 0 316 671 B1 | 5/1993 |
| EP | 0718330 A1 | 6/1996 |

OTHER PUBLICATIONS

Walter et al., partial electronic translation of EP 0316 671, Nov. 1988.*
English-language Abstract of EP 0 316 671 from Espacenet.
International Search Report in PCT Application No. PCT/EP2013/063096 dated Jan. 3, 2014.
International Preliminary Report on Patentability in PCT Application No. PCT/EP2013/063096 dated Dec. 29, 2014.

* cited by examiner

*Primary Examiner* — Jeffrey Mullis
(74) *Attorney, Agent, or Firm* — J.A. Lindeman & Co., PLLC

(57) ABSTRACT

Process for the production of asymmetric, star-branched block copolymers which comprise, incorporated into the polymer, from 60 to 95% by weight of vinylaromatic and from 40 to 5% by weight of a conjugated diene having from 4 to 5 C atoms, based on the branched block copolymer, via sequential anionic polymerization and subsequent coupling of the resultant living block-copolymer anions by a coupling agent, and also vinylaromatic-diene block copolymers obtainable via the process and use of these for moldings and for thermoforming foils.

11 Claims, No Drawings

METHOD FOR PRODUCING ASYMMETRICALLY FORMED, STAR-BRANCHED VINYL AROMATIC-DIENE BLOCK COPOLYMERS

The invention relates to a process for the production of asymmetric, star-branched vinylaromatic-diene block copolymers, and also to the resultant polymers and mixtures thereof with thermoplastics, in particular with polystyrene. The products produced by the process of the invention are used for the production of moldings and of thermoforming foils.

Production of tough transparent products such as foils frequently uses star-shaped styrene-butadiene block copolymers (SBS), often in a mixture with standard polystyrene (PS). The production process generally takes place via sequential anionic polymerization and subsequent coupling to give a product made of star-shaped S/B block copolymers randomly constituted in respect of the branches of the star. The diene content of these S/B star polymers is preferably from 15 to 40% by weight, in order to achieve good toughness-efficiency together with a good toughness-stiffness relationship. Star polymers composed only of short chains with high butadiene content impair transparency in a blend with standard polystyrene, while high-molecular-weight block copolymers with very low butadiene content are brittle. It is therefore desirable to produce S/B star polymers which, specifically in mixtures with PS, have high toughness-efficiency together with good transparency and thermal stability, and thus ensure a broad range of applications for this class of polymer.

U.S. Pat. No. 3,639,517 describes the production of star-shaped SB block copolymers via double or multiple initiation of styrene by alkyllithium compounds in a reaction vessel, subsequent reaction with butadiene, and subsequent coupling of the living polybutadiene carbanion to give star polymers. U.S. Pat. No. 4,091,053 describes an improved form of the abovementioned double initiation where the ratio of initiator 2 (I2) to initiator 1 (I1) is varied. A large I2/I1 ratio (about 8.5) gives block copolymers with high elongation at break (comparative examples), while the block copolymers produced with a small I2/I1 ratio (about 1.5) as in the inventive examples have improved film hinge properties and stiffness but poorer elongation.

EP-A 0 316 671 describes asymmetric, star-branched block copolymers which have a long styrene/diene block made of a pentablock having two separate polydiene segments.

After the first initiation and reaction of styrene, a small portion of diene or a diene/styrene mixture is added. In a further step in the same reactor, a further larger portion of initiator is first added, styrene is then added, and then further diene is added with styrene. After the sequential anionic polymerization the resultant mixture of block-copolymer anions is coupled to give star polymers. The products have increased flowability and better toughness. Disadvantages are their reduced transparency in a blend with polystyrene and the occurrence of gel particles, known as fish-eyes, caused by crosslinking.

The products obtained according to the prior art do not achieve a satisfactory combination of high toughness, good transparency, easy processing, and high processing stability.

It was therefore an object to provide vinylaromatic/diene block copolymers which, with conventional diene content, feature increased toughness-efficiency with the same transparency, in particular in blends with standard polystyrene, and thermal stability.

Said object is achieved via the vinylaromatic-diene block copolymers of the invention, which are obtainable via the process of the invention.

The invention provides a process for the production of asymmetric, star-branched block copolymers which comprise, incorporated into the polymer, from 60 to 95% by weight of vinylaromatic and from 40 to 5% by weight of a conjugated diene having from 4 to 5 C atoms, based on the coupled block copolymer, via sequential anionic polymerization and subsequent coupling of the resultant living block-copolymer anions by a coupling agent, characterized in that a1) in a first reactor, from 30 to 75% by weight of vinylaromatic, based on the entire vinylaromatic content of the coupled block copolymer, are polymerized to completion in the presence of an initiator Ia to give vinylaromatic-block anions Sa with molar mass Mw from 40 000 to 250 000 g/mol;

a2) from 5 to 60% by weight of diene, based on the entire diene content of the branched block copolymer, are then added to the vinylaromatic-block anion Sa and polymerized to completion to give a block-copolymer anion SaB1 having a diene block B1;

b) separately in another reactor, in the presence of an initiator Ib, from 25 to 70% by weight of vinylaromatic are subjected to single or multiple initiation and are polymerized to completion to form one or more vinylaromatic-block anions Sb1 to Sbn+1 with molar mass Mw from 5000 to 50 000 g/mol;

c) the anionic blocks SaB1 and Sb1 to Sbn+1 obtained in a2) and b) are combined in a reactor;

d) the remaining quantity of diene, based on the entire diene content of the branched block copolymer, is added to this mixture and polymerized to completion to give block-copolymer anions SaB1B2 and, respectively, Sb1B2 to Sbn+1B2 comprising diene blocks B2; and e) the resultant block-copolymer anions are coupled by a di- or polyfunctional coupling agent to give a branched block copolymer.

The molar mass (Mw) is the weight-average molar mass.
Another term used for the diene block B1 and, respectively, B2 is the soft phase of the branched block copolymer.

The molar mass (Mw) is the weight-average molar mass.
Another term used for the diene block B1 and, respectively, B2 is the soft phase of the branched block copolymer.

The diene block B1 can comprise one or more polyvinylaromatic blocks with a molar mass Mw of respectively at most 8000 g/mol. To this end, it is preferable that in step a2) of the process of the invention the diene is added together with the vinylaromatic.

The diene blocks B2 can also comprise vinylaromatic units with a molar mass Mw of respectively at most 8000 g/mol. To this end, it is preferable that in step d) of the process of the invention the diene is added together with vinylaromatic.

A total of at most 30% by weight of the entire quantity of vinlyaromatic, preferably up to 25% by weight, can be used for incorporation into the soft phase, i.e. into the diene block B1 and diene blocks B2.

Suitable conjugated dienes for the process of the invention are 1,3-dienes, preferably 1,3-butadiene, isoprene, 2,3-dimethylbutadiene, and/or 1,3-pentadiene, particularly preferably 1,3-butadiene.

Suitable vinylaromatics for the process of the invention are styrene, α-methylstyrene, o-, m-, or p-substituted alkylstyrenes, vinylnaphthalene, and/or 1,1-diphenylethylene, preferably styrene, α-methylstyrene, o-, m-, or p-substituted alkylstyrenes, such as o-, m-, and/or p-methylstyrene, particularly preferably styrene.

The process of the invention can use one vinylaromatic or else a plurality of different vinylaromatics.

It is particularly preferable to produce, via the process of the invention, block copolymers which comprise, incorporated into the polymer, from 60 to 95% by weight of styrene and from 40 to 5% by weight of 1,3-butadiene, based on the branched block copolymer.

When the block copolymers produced by the process of the invention, made of vinylaromatic and conjugated diene, are compared with those of the prior art they exhibit optimized polydiene distribution and have improved toughness-efficiency particularly in a blend with standard polystyrene, with better retention of transparency.

The process of the invention is explained in more detail below.

The production of asymmetric, star-branched block copolymers is well known from the prior art cited above [cf. in particular EP 0316671 A2]. Star-block copolymers, and in particular asymmetrical star-block copolymers, are well known to the person skilled in the art (cf. Kunststoffhandbuch, Bd. 4 Polystyrol, Kap. 3.3.4.2 [Plastics Handbook, volume 4, Polystyrene, chapter 3.3.4.2], Hanser Verlag, 1996). The expression star-block copolymers in the invention includes block copolymers of the coupling product of SaB1 and Sb1 to Sbn+1, where said block copolymers are coupled to one another via difunctional coupling agents.

Sequential anionic polymerization is known per se. It preferably uses monolithium hydrocarbon compounds R—Li as initiator, where R can be an aliphatic, cycloaliphatic, or aromatic hydrocarbon moiety having from 1 to 12 C atoms. It is preferable to use n-butyllithium or sec-butyllithium. When n-butyllithium (n-BuLi) is used an activator is required, preferably an ether such as THF. For the activation of n-BuLi it is preferable to add from 0.01 to 0.1% by volume of THF, based on the solvent.

The process of the invention is preferably carried out in a nonpolar solvent, preferably cyclohexane, which is used as initial charge in the respective vessels. Sequential anionic polymerization is preferably carried out at a temperature in the range from 20 to 100° C.

The initiator is used in well-known quantities which are derived from the desired molar masses.

The expression quantity of initiator means the entire quantity of initiator corresponding to the total quantity $\Sigma Ia$ and, respectively $\Sigma Ib$ of the initiator, which is optionally used more than once (n times). n here is preferably an integer from 1 to 3.

The initiation ratio for coupled S/B block copolymers describes the molar ratio of quantity $\Sigma Ia$ of initiator used for the long vinylaromatic block Sa to the quantities $\Sigma Ib$ of initiator used, i.e. $\Sigma Ib1$ to Ibn+1, for the initiation of the short vinylaromatic blocks Sb1 to Sbn. It is preferable that the molar ratio $\Sigma Ia$ to $\Sigma Ib$ is in the range from 1:10 to 1:1, particularly in the range from 1:7 to 1:2. Smaller molar initiation ratios, e.g. 1:20, lead to a larger number of star polymers with exclusively shorter S blocks, with a resultant increase in incompatibility in blends with polystyrene, and consequential impairment of the transparency of the resultant S/B block copolymer/PS mixtures.

The molar mass Mw of the long polyvinylaromatic block Sa obtained after step a1) of the process of the invention is in the range from 40 000 to 250 000 g/mol, preferably from 50 000 g/mol to 200 000 g/mol. The proportion of vinylaromatic used for this, based on the entire vinylaromatic content of the branched block copolymer, is in the range from 30 to 75% by weight, preferably in the range from 35 to 72% by weight. The remaining quantity of vinylaromatic, i.e. from 25 to 70% by weight, preferably from 38 to 65% by weight, can be used in various ways. The polyvinylaromatic block Sa can also have a broad molar mass distribution, or be bi- or oligomodal. A broad molar mass distribution can be achieved via partially parallel feed of initiator and monomer, and a bi- or oligomodal distribution can be obtained via a double or multiple initiator-monomer sequence, where the mixture is polymerized to completion after each monomer addition.

The transition from the hard segment (polyvinylaromatic block) S to the soft phase B in the invention can be either a sharp or a gradual transition. A sharp transition is achieved by adding the monomer of the soft phase B to the reaction mixture only after complete reaction of the vinylaromatic monomer. A gradual transition is achieved by adding the monomer of the soft phase B to the reaction mixture before complete reaction of the vinylaromatic monomers. It is also possible that a combination of various transitions and soft phases is present within a coupled S/B block copolymer.

Quantities of diene of from 5 to 40% by weight are available in the invention for the structure of the soft phase B. A proportion of these is first reacted in step a2) of the process of the invention with the long vinylaromatic-block anion Sa to give SaB1. Up to 50% by weight of the diene comprised in the coupled S/B block copolymer are used for the reaction with the long vinylaromatic-block anion Sa. Molar masses Mw obtained for the B1 block here are preferably from 3000 to 30 000 g/mol.

The production of the short vinylaromatic blocks Sb1 to Sbn+1 in the process of the invention takes place in step b) at a separate location in a separate reactor. The reactor can by way of example be a tank, a tube, a heat exchanger, or a stirred reactor. It is preferable that the reactor has cooling equipment; this can be a coolant that wets the external wall of the reactor, or can take the form of an evaporative cooler on the reactor, or can be a cooling circuit with a heat exchanger.

The molar mass Mw of the short vinylaromatic blocks Sb1 to Sbn+1 is at least 5000 g/mol, particularly in the range from 10 000 g/mol to 50 000 g/mol. The vinylaromatic blocks Sb1 to Sbn+1 can also have a broad molar mass distribution or be bi- or oligomodal. It is preferable that the blocks Sb1 to Sbn+1 are subjected to single to four-fold initiation. In the case of broad molar mass distributions the weight-average molar mass $M_w$ of the individual vinylaromatic blocks Sb1 to Sbn+1 is at most 50 000 g/mol.

In step c) of the process of the invention the reaction solution comprising the living block-copolymer anion SaB1 and the reaction solution comprising the short living vinylaromatic-block anions Sb1 to Sbn+1 are brought together in a reactor. This can be the reactor in which Sa has previously been produced, or that in which Sb has been produced, or else a third reactor. As described above, the reactors can be of various designs and preferably have cooling equipment. In step d) of the process of the invention the remaining quantity of diene B2 is added to this combined reaction solution comprising SaB1 and Sb1 to Sbn+1, and polymerized to completion. Molar masses Mw obtained here for the individual B2 blocks are preferably from 3000 to 30 000 g/mol.

In another embodiment of the process of the invention it is also possible by way of example to add only Sb1 to SaB1, and react this with the diene B2 to give SaB1B2 and Sb1B2, and simultaneously in another reactor copolymerize vinylaromatic-block anions Sb2 to Sbn+1, and then to add Sb2 to Sbn+1 simultaneously or in succession to the mixture of SaB1B2 and of the vinylaromatic-block anions Sb already reacted with B2, and then to react the resultant mixture further with the remaining quantity of diene B2.

This staged structure described can take place a number of times until finally Sbn+1 is added.

The soft phase B, i.e. diene blocks B1 and/or B2, of the branched block copolymers produced by the process of the invention can take the form of diene-homopolymer segments, random S/B copolymers, or tapered blocks, or of a combination of the possibilities mentioned.

The structure of the soft phase B in the process of the invention can result from addition of diene alone to form a diene homopolymer block or from addition of diene together with vinylaromatic. This results in incorporation of vinylaromatic monomer into the diene-homopolymer block. This can lead to tapered blocks, where at the beginning of the polymerization reaction diene is incorporated almost exclusively, and the reaction and, respectively, incorporation of the vinylaromatic takes place only after almost complete reaction of the diene.

It is also possible to obtain random blocks via addition of polar compounds known as randomizers, such as ethers or potassium salts, particularly THF or potassium tert-amyl alcoholate (PTA). In order to increase "randomization" it is advantageous for the two monomers to be added together in a plurality of steps, i.e. via a number of additions of the monomer mixture, preferably from 2 to 6. In the selection of the "randomizers" preference is given to those which give less than 20% 1,2-vinyl content of the diene, in order to achieve good thermal stability of the soft phase. The molar ratio of initiator to potassium-salt randomizers is preferably 37:1, in order to bring about random copolymerization. When THF is used as randomizer it is preferable to use from 0.25 to 0.4% by volume, based on the solvent.

A total of at most 30% by weight of the entire quantity of vinylaromatic, preferably up to 25% by weight, can be used in the process of the invention for incorporation into the soft phase B, i.e. into the diene block B1 and the diene blocks B2.

In the process of the invention it is possible, in the manner described above, to incorporate one or more vinylaromatic blocks into the soft segment B1 and/or the soft segments B2, where the molar mass Mw of the individual vinylaromatic blocks may be at most 8000 g/mol, and the soft phase B can take the form described above.

In an optional step of the process of the invention, before the coupling in step e), a short vinylaromatic block S can be polymerized onto the combined long and short branches provided with the soft phase B2, i.e. block-copolymer anions SaB1B2 and, respectively, Sb1B2 to Sbn+1B2. From 1 to 10% by weight of the entire quantity of vinylaromatic of the coupled block copolymer are used for this purpose. The vinylaromatic can be added either after completed reaction of the soft phase B2, together with the diene of the soft phase B2, or during the polymerization of the soft phase B2. The molar mass Mw of this short vinylaromatic block S in the abovementioned block-copolymer anions is usually from 1000 to 10 000 g/mol.

The abovementioned embodiments can also be combined.

In the final step e) of the process of the invention, the coupling of the living linear S/B block-copolymer anions is achieved via addition of di-, oligo-, or polyfunctional coupling agent to the reaction solution. The functionality of the coupling agent here is preferably in the range from 2 to 6. Usual coupling agents are known polyepoxides, epoxidized vegetable oils, divinylbenzene, oligoisocyanates, di- and oligocarboxylic esters, or silicon polyhalides. Preferred coupling agents used are epoxidized vegetable oils such as epoxidized linseed oil or epoxidized soybean oil, particularly epoxidized soybean oil. Preference is likewise given to esters such as ethyl acetate, diethyl adipate, diethyl carbonate, ethylene carbonate, or propylene carbonate.

The functionality of the coupling agent in the process of the invention is preferably selected in accordance with the formula "x times molar ratio of $\Sigma Ia$ to $\Sigma Ib$", where x is generally a number from 0.3 to 4, preferably a number from 0.5 to 2, very particularly preferably a number from 0.7 to 1.5, and $\Sigma Ia$ and $\Sigma Ib$ are defined as described above.

The statistical result of the use of a coupling agent with a functionality corresponding to the formula is, after the coupling reaction, production of a large number of star polymers having at least one long branch SaB1 B2, thus ensuring compatibility with polystyrene in the mixture.

Before the branched block copolymers obtained after the coupling step e) are isolated it is optionally possible to carry out a treatment with proton donors, e.g. with water, alcohols, carboxylic acids, and the like. Particular preference is given to the treatment with a mixture of water and carbon dioxide, so that the lithium is predominantly or entirely present in the form of lithium hydrogen carbonate.

Other possibilities before isolation are addition of oxidation stabilizers, flow aids such as white oil, mold-release agents such as erucamide, stearamides, and other auxiliaries. The desired products are isolated from the solution in the usual way, e.g. with removal of the solvent via evaporation, or via precipitation, and filtration and drying of the polymer. Preference is given to a two-stage evaporation process in which the dilute polymer solution is first heated to from 180 to 230° C., and is depressurized in a depressurization vessel, thus giving a 75-95% solution, which is freed from residual solvent in another apparatus, preferably an extruder, and granulated. It is also possible to use a falling-film evaporator instead of a depressurization vessel for the preliminary concentration process.

It is quite essential for the process of the invention, and for the resultant star-shaped block copolymers of the invention, which feature a specifically adjustable diene content in the long S/B block and in the short S/B blocks, that the long Sa-B1 block and the short Sb1 to Sbn+1 blocks are produced at separate locations in separate vessels, such as stirred or unstirred reactors, tanks, tubes or tube bundles, plate heat exchangers or tube-bundle heat exchangers, or non-pumped tanks, preferably in combination with heat exchangers.

The process of the invention can be operated batchwise and/or continuously with at least two reactors. In the case of batchwise operation, preference is given to use of two reactors of size appropriate to the quantities of monomer. If the process is operated continuously, there is connection between the reactors in such a way that after production of the short vinylaromatic-block anions Sb1 to Sbn+1 the reaction solution comprising these can be combined at the appropriate time with the reaction solution comprising SaB1. In another embodiment of the process of the invention, continuous and batchwise operation can be combined with one another.

By virtue of the process of the invention it is possible to achieve specific variation of the distribution of the diene within the star-shaped polymers of the invention. By virtue of the process of the invention it is possible, by using an appropriate diene block B1, to obtain star polymers in which all of the branches of the block copolymers, i.e. not only the long branch SaB1B2 but also the short branches Sb1B2 to Sbn+1B2 have the same proportion by weight of diene.

It is likewise possible in the invention to produce star polymers in which the long branch SaB1B2 has a markedly higher, or a markedly lower, proportion by weight of diene than the short branches Sb1B2 to Sbn+1B2.

The invention further provides the asymmetric, star-branched vinylaromatic-diene block copolymers obtainable by the process of the invention. Examples of preferred vinylaromatic-diene block copolymers are styrene-butadiene block copolymers of the following structures:

St1–Bu1–Bu2–x+St2–Bu2–x
St1–Bu1–Bu2→St3–x+St2–Bu2→St3–x
St1–Bu1–Bu2–x+St2–St3–Bu2–x+St3–Bu2–x
St1–Bu1–Bu2→St4–x+St2–St3–Bu2→St4–x+St3–Bu2→St4–x
St1–Bu1–Bu2–Bu3–x+St2–Bu2–Bu3–x+St3–Bu3–x
St1–St2–Bu1–Bu2–x+St2–Bu1–Bu2–x+St3–Bu2–x
St1–St2–Bu1–Bu2→St4–x+St2–Bu1–Bu2→St4–x+St3–Bu2→St4–x
St1–(St/Bu)1–(St/Bu)2–x+St2–(St/Bu)2–x
St1–(St/Bu)1–(St/Bu)2–x+St2–St3–(St/Bu)2–x+St3–(St/Bu)2–x
St1–Bu1–Bu2–Bu3→S4–x+St2–Bu2–Bu3→S4–x+St3–Bu3→S4–x

The arrow in these structures symbolizes a "gradual transition" from butadiene to styrene, and the oblique symbolizes random copolymerization with uniform incorporation of monomer. A plus sign separates the different branches of the star; x symbolizes the link to the coupling agent.

The entire composition of the block copolymers produced by the process of the invention comprises from 60 to 95% by weight, preferably from 70 to 85% by weight, particularly preferably from 72 to 78% by weight, of vinylaromatic and from 5 to 40% by weight, preferably from 15 to 30% by weight, particularly preferably from 22 to 28% by weight, of at least one conjugated diene having 4 or 5 C atoms, for example butadiene or isoprene, preference being given here to butadiene.

The products obtainable by the process of the invention can be used in the invention for the production of moldings (or foils) with addition of conventional auxiliaries, such as stabilizers, lubricants, antiblocking agents, flame retardants, and optionally also fillers. The processing is achieved here in a manner known per se by the conventional processes, e.g. via extrusion, thermoforming, or injection molding. The products have particular suitability in the invention for the production of moldings and foils, in particular thermoforming foils, for packaging.

The block copolymers obtainable by the process of the invention can be blended with thermoplastics such as polystyrene, impact-resistant polystyrene, or polyphenylene oxide in any desired ratios. The invention further provides thermoplastic mixtures comprising the block copolymers obtainable by the process of the invention. Preference is given to thermoplastic mixtures of styrene-butadiene block copolymers obtainable by the process of the invention and a thermoplastic such as polystyrene.

A feature of the products obtainable by the process of the invention, particularly in a mixture with standard polystyrene, is improved toughness-efficiency with retention of transparency.

The invention is explained in more detail via the following examples and claims.

EXAMPLES

Chemicals used: styrene (producer: BASF SE)
sec-Butyllithium (12% by weight) in cyclohexane/n-hexane mixture (from Chemetall)
Butadiene (from BASF SE)

The styrene derives from the styrene distillation system of the styrene plant (of the applicant) and was used without further purification; the cyclohexane was dried at room temperature by use of an aluminum oxide column, and the butadiene was dried at –10° C. by use of aluminum oxide and freed from the stabilizer.

The GPC measurements were made in accordance with the standard DIN 55672 in THF with use of a refractive-index detector (ERC-RI-101). Calibration was achieved by using polystyrene standards from Polymer Laboratories. It should be noted here that the molar mass of the butadiene units is overestimated by a factor of about 1.72. Mn is the number-average molar mass, Mw is the weight-average molar mass, and Mp is the molar mass at the peak maximum. If a polymodal molar mass distribution is observed, i.e. a plurality of peak maxima, all of the Mp values are stated. The data for Mn and Mw are always based on the entire breadth of the molar mass distribution.

For each inventive and comparative example, a double-walled, simultaneously heatable and coolable 10-liter stainless-steel autoclave, equipped with a crossblade stirrer, was prepared via flushing with nitrogen and scalding with cyclohexane/sec-BuLi. Cyclohexane was then charged, and the quantities of initiator and monomers, and optionally further solvent, stated in the respective examples were added. The temperature of the reaction mixture was controlled via heating or cooling of the reactor jacket. Work-up was achieved by the usual methods. After the reaction had ended, isopropanol was added to protonate the carbanions.

The glass transition temperatures were determined by means of DSC (differential scanning calorimetry, ISO 11357-2).

Comparative Example 4786 ml (3733 g) of cyclohexane were used as initial charge with 1.29 ml of THF and 672 ml (609.1 g) of styrene in the reactor, and titrated to endpoint with 1.4-molar sec-BuLi solution until a slight yellow coloration appeared. Immediately thereafter, 4.31 ml of the same BuLi solution were used for initiation, giving a solution with a strong yellowish-orange color. The internal temperature was kept at about 70-80° C. via external cooling. After the heat of reaction had dissipated, a specimen was taken for GPC measurement, and was immediately deactivated with isopropanol (Mp 95 639 g/mol). 5.09 ml of BuLi were then added, followed by 315 ml (285.3 g) of styrene, and the mixture was again polymerized until the heat of reaction had dissipated (specimen: Mp 119 990 and 22 460 g/mol). Again, 15.12 ml of BuLi and 286 ml (259.0 g) of styrene were added, and a specimen was taken after the heat of reaction had dissipated (Mp 129 120, 30 488, and 7228 g/mol). Finally, 611 ml (400 g) of butadiene and 51 ml (46.6 g) of styrene were added simultaneously. Once the heat of reaction had dissipated and a specimen had been taken (Mp 156 177, 57 196, and 31 589 g/mol; Mn 58 302 g/mol, Mw 99 045), coupling was achieved via addition of 2.15 ml of epoxidized soybean oil at 80° C. The color changed here from orange to pale yellow. After a further 15 minutes, 2.5 ml of isopropanol was added, and the solution was cooled to 30° C. and discharged into a canister, where 8 ml of water and 16 g of dry ice were admixed, and the solution was vigorously shaken in order to acidify same (polymodal molar mass distribution, Mn 96 243 g/mol, Mw 170 180). Stabilization was then achieved via addition of 3.2 g of Sumilizer GS and 3.2 g of Irganox 1010, these having been dissolved in toluene. The cyclohexane was then removed in an EX vacuum drying oven. 1.6 kg of a clear, colorless resin were obtained. The glass transition temperatures were −80 and 99° C. Melt viscosity was determined as MVR (melt viscosity rate) at 200° C., and was 7.7 ml/10 min.

Inventive Example 1

3618 ml (2822 g) of cyclohexane were used as initial charge with 0.97 ml of THF and 837 ml (758.7 g) of styrene in the stainless-steel reactor, and titrated to endpoint with 1.4-molar sec-BuLi solution until a slight yellow coloration appeared. Immediately thereafter, 5.36 ml of the same BuLi solution were used for initiation, giving a solution with a strong yellowish-orange color. The internal temperature was kept at about 70-80° C. via external cooling. Once the heat of reaction had dissipated, 164 ml (109.3 g) of butadiene were added and polymerization was carried out to completion for 20 minutes at 80° C. until no further heat was evolved, and a specimen taken for GPC measurement was immediately deactivated with isopropanol (Mp 143 560 g/mol). The living solution in the reactor was cooled to 60° C.

After inertization of a 2-liter round-bottomed glass flask equipped with blade stirrer, nitrogen connection, and port(s) for addition of monomer and initiator, 1168 ml (911 g) of cyclohexane, 0.32 ml of THF, and 137 ml (124.5 g) of styrene were used as initial charge, titrated to end point with BuLi until a slight yellow coloration appeared, and initiated by 6.32 ml of BuLi. The location of the round-bottomed flask was in a water bath, which kept the internal temperature in the range from 60 to 70° C.

Once the heat of reaction had dissipated and after cooling to 50° C., a specimen was taken for GPC measurement (Mp 12 573), 15.12 ml of BuLi and 286 ml (259.0 g) of styrene were added and, once the heat of reaction had dissipated, the orange-colored solution was cooled to 25° C. (GPC: Mp 20 082 and 7313 g/mol) and transferred under inert conditions into the stainless-steel reactor with the living solution. 444 ml (290.6 g) of butadiene and 56 ml (50.9 g) of styrene were then simultaneously added to the reactor. Once the heat of reaction had dissipated and a specimen had been taken (Mp 164 671, 36 941, and 23 313 g/mol; Mn 49 837 g/mol, Mw 109 570), coupling was achieved at 80° C. via addition of 2.67 ml of epoxidized soybean oil. The color changed here from orange to pale yellow. After a further 15 minutes, 2.5 ml of isopropanol was added, and the solution was cooled to 30° C. and discharged into a canister, where 8 ml of water and 16 g of dry ice were admixed, and the solution was vigorously shaken in order to acidify same (polymodal molar mass distribution, Mn 79 498 g/mol, Mw 172 620). Stabilization was then achieved via addition of 3.2 g of Sumilizer GS and 3.2 g of Irganox 1010, these having been dissolved in toluene. The cyclohexane was then removed in an EX vacuum drying oven. 1.6 kg of a clear, colorless resin were obtained. The glass transition temperatures were −72 and 63° C.

Inventive Example 2

3618 ml (2822 g) of cyclohexane were used as initial charge with 0.97 ml of THF and 837 ml (758.7 g) of styrene in the stainless-steel reactor, and titrated to endpoint with 1.4-molar sec-BuLi solution until a slight yellow coloration appeared. Immediately thereafter, 5.36 ml of the same BuLi solution were used for initiation, giving a solution with a strong yellowish-orange color. The internal temperature was kept at about 70-80° C. via external cooling. Once the heat of reaction had dissipated and a specimen had been taken for GPC (Mp 111 120 g/mol), 167 ml (109.6 g) of butadiene were added, and polymerization was carried out to completion for 20 minutes at 80° C. until no further heat was evolved, and a further GPC specimen was taken (Mp 138 130 g/mol).

The living solution in the reactor was cooled to 60° C.

After inertization of a 1-liter round-bottomed glass flask equipped with blade stirrer, nitrogen connection, and port(s) for addition of monomer and initiator, 570 ml (445 g) of cyclohexane, 0.15 ml of THF, and 213 ml (193.0 g) of styrene were used as initial charge, titrated to end point with BuLi until a slight yellow coloration appeared, and initiated by 6.32 ml of BuLi. The location of the round-bottomed flask was in a water bath, which kept the internal temperature in the range from 60 to 70° C. Once the heat of reaction had dissipated, and after cooling to 25° C., a specimen was taken for GPC measurement (Mp 20 893), and the flask contents with the living polystyrene were quantitatively transferred under inert conditions into the stainless-steel reactor with the living solution.

38 ml (24.6 g) of butadiene were then added to the reactor, the mixture was polymerized for 15 minutes at 80° C. (Mp 147 892 and 27 958 g/mol), and then the living solution was cooled to 60° C.

In another 1-liter round-bottomed flask, 598 ml (466 g) of cyclohexane, 0.17 ml of THF, and 220 ml (200.0 g) of styrene were analogously used as initial charge, titrated with BuLi, and initiated by 18.83 ml of BuLi.

Once the heat of reaction had dissipated, and after cooling to 25° C., a specimen was taken for GPC measurement (Mp 78 217 g/mol), and the flask contents with the living polystyrene were quantitatively transferred under inert conditions into the stainless-steel reactor with the living solution. 406 ml (265.8 g) of butadiene and 51 ml (46.6 g) of styrene were then simultaneously added to the reactor. Once the heat of reaction had dissipated and a specimen had been taken (Mp 161 719, 44 595, and 24 326 g/mol; Mn 51 766 g/mol, Mw 105 440), coupling was achieved at 80° C. via addition of 2.67 ml of epoxidized soybean oil.

The color changed here from orange to pale yellow. After a further 15 minutes, 2.5 ml of isopropanol was added, and the solution was cooled to 30° C. and discharged into a canister, where 8 ml of water and 16 g of dry ice were admixed, and the solution was vigorously shaken in order to acidify same (polymodal molar mass distribution, Mn 87 974 g/mol, Mw 177 540).

Stabilization was then achieved via addition of 3.2 g of Sumilizer GS and 3.2 g of Irganox 1010, these having been dissolved in toluene. The cyclohexane was then removed in an EX vacuum drying oven. 1.6 kg of a clear, colorless resin were obtained. The glass transition temperatures were −82 and 99° C.

The copolymer obtained can be used to produce foils and moldings via mixing with commercially available polystyrene, by known methods.

What is claimed is:

1. A process for the production of asymmetric, star-branched block copolymers which comprise, incorporated into the polymer, from 60 to 95% by weight of vinylaromatic and from 40 to 5% by weight of a conjugated diene having from 4 to 5 C atoms, based on the branched block copolymer, via sequential anionic polymerization and subsequent coupling of the resultant living block-copolymer anions by a coupling agent, characterized in that
   a1) in a first reactor, from 30 to 75% by weight of vinylaromatic, based on the entire vinylaromatic content of the branched block copolymer, are polymerized to completion in the presence of an initiator Ia to give vinylaromatic-block anions Sa with molar mass Mw from 40 000 to 250 000 g/mol;
   a2) from 5 to 60% by weight of diene, based on the entire diene content of the branched block copolymer, are then added to the vinylaromatic-block anion Sa and polymerized to completion to give a block-copolymer anion SaB1 having a diene block B1;
   b) separately in another reactor, in the presence of an initiator Ib, from 25 to 70% by weight of vinylaromatic are subjected to single or multiple initiation and are polymerized to completion to form one or more vinylaromatic-block anions Sb1 to Sbn+1 with molar mass Mw from 5000 to 50 000 g/mol;
   c) the anionic blocks SaB1 and Sb1 to Sbn+1 obtained in a2) and b) are combined in a reactor;
   d) the remaining quantity of diene, based on the entire diene content of the branched block copolymer, is added to this mixture and polymerized to completion to give block-copolymer anions SaB1B2 and, respectively, Sb1B2 to Sbn+1B2 comprising diene blocks B2; and
   e) the resultant block-copolymer anions are coupled by a di- or polyfunctional coupling agent to give a branched block copolymer.

2. The process as claimed in claim 1, characterized in that, before the coupling step e), the block-copolymer anions SaB1B2 and, respectively, Sb1B2 to Sbn+1B2 are reacted with vinylaromatic in a quantity of from 1 to 10% by weight of the entire vinylaromatic quantity of the branched block copolymer, where the molar mass Mw of the respective vinylaromatic block S obtained is from 1000 to 10 000 g/mol.

3. The process as claimed in claim 1, characterized in that in step a2) the diene is added together with a vinylaromatic, where the quantity of vinylaromatic is from 1 to 15% by weight, based on the entire quantity of vinylaromatic, so that the resultant diene block B1 can comprise one or more vinylaromatic blocks with molar mass Mw from 500 to 8000 g/mol.

4. The process as claimed in claim 1, characterized in that in step d) the diene is added together with a vinylaromatic, where the quantity of vinylaromatic is from 1 to 15% by weight, based on the entire quantity of vinylaromatic, so that the resultant diene block B2 comprises one or more vinylaromatic blocks with molar mass Mw from 500 to 8000 g/mol.

5. The process as claimed in claim 1, characterized in that styrene is used as vinylaromatic and 1,3-butadiene is used as diene.

6. A star-branched block copolymer containing from 60 to 95% by weight of vinylaromatic and from 40 to 5% by weight of a conjugated diene having from 4 to 5 C atoms, based on the branched block copolymer, said copolymer prepared by a process of sequential anionic polymerization and subsequent coupling of the resultant living block-copolymer anions by a coupling agent, wherein the process consists of steps:
   a1) in a first reactor, from 30 to 75% by weight of vinylaromatic, based on the entire vinylaromatic content of the branched block copolymer, are polymerized to completion in the presence of an initiator Ia to give vinylaromatic-block anions Sa with molar mass Mw from 40 000 to 250 000 g/mol;
   a2) from 5 to 60% by weight of diene, based on the entire diene content of the branched block copolymer, are then added to the vinylaromatic-block anion Sa and polymerized to completion to give a block-copolymer anion SaB1 having a diene block B1;
   b) separately in another reactor, in the presence of an initiator Ib, from 25 to 70% by weight of vinylaromatic are subjected to single or multiple initiation and are polymerized to completion to form one or more vinylaromatic-block anions Sb1 to Sbn+1 with molar mass Mw from 5000 to 50 000 g/mol;
   c) the anionic blocks SaB1 and Sb1 to Sbn+1 obtained in a2) and b) are combined in a reactor;
   d) the remaining quantity of diene, based on the entire diene content of the branched block copolymer, is added to this mixture and polymerized to completion to give block-copolymer anions SaB1B2 and, respectively, Sb1B2 to Sbn+1B2 comprising diene blocks B2;
   e) optionally, a short vinylaromatic block S is polymerized onto the block-copolymer anions SaB1B2 and, respectively, Sb1B2 to Sbn+1B2; and
   f) the resultant block-copolymer anions are coupled by a di- or polyfunctional coupling agent to give a branched block copolymer.

7. A molding or thermoforming foil comprising at least one block copolymer according to claim 6.

8. A thermoplastic mixture comprising at least one block copolymer according to claim 6 and at least one thermoplastic component.

9. A thermoplastic mixture comprising at least one star-branched block copolymer according to claim 6 and polystyrene.

10. A process for the production of a thermoplastic mixture comprising the step of mixing at least one star-branched block copolymer according to claim 6 and another thermoplastic component.

11. A process as claimed in claim 10, wherein the another thermoplastic polymer is polystyrene.

* * * * *